United States Patent

Friedrich et al.

[11] Patent Number: 5,884,602
[45] Date of Patent: Mar. 23, 1999

[54] PROCESS FOR SUPPRESSING TORQUE JUMPS DURING OPERATION OF AN INTERNAL COMBUSTION ENGINE

[75] Inventors: Arno Friedrich, Regensburg; Klaus Wenzlawski, Nürnberg, both of Germany

[73] Assignee: Siemens Aktiengesellschaft, Munich, Germany

[21] Appl. No.: 910,649

[22] Filed: Aug. 13, 1997

[30] Foreign Application Priority Data

Aug. 13, 1996 [DE] Germany ............... 196 32 650.8

[51] Int. Cl.⁶ ............... F02D 41/40; F02M 45/04
[52] U.S. Cl. ............... 123/300; 123/305
[58] Field of Search ............... 123/295, 299, 123/300, 305

[56] References Cited

U.S. PATENT DOCUMENTS

| | | | |
|---|---|---|---|
| 4,782,803 | 11/1988 | Kikuchi | 123/300 |
| 5,078,107 | 1/1992 | Morikawa | 123/299 X |
| 5,170,759 | 12/1992 | Ito | 123/300 X |
| 5,331,933 | 7/1994 | Matsushita | 123/300 X |

FOREIGN PATENT DOCUMENTS

3935937A1  5/1990  Germany.

Primary Examiner—Tony M. Argenbright
Attorney, Agent, or Firm—Herbert L. Lerner; Laurence A. Greenberg

[57] ABSTRACT

A process for suppressing torque jumps during operation of an internal combustion engine prevents torque jumps when switching pilot injection (pre-injection) on and off in a diesel internal combustion engine by forming a difference between a predetermined total quantity of fuel to be injected and a pilot quantity to be injected by a pilot injector and acting upon the difference with a correction factor that produces torque balancing. A difference quantity which is corrected in this manner represents a main injection quantity.

4 Claims, 2 Drawing Sheets

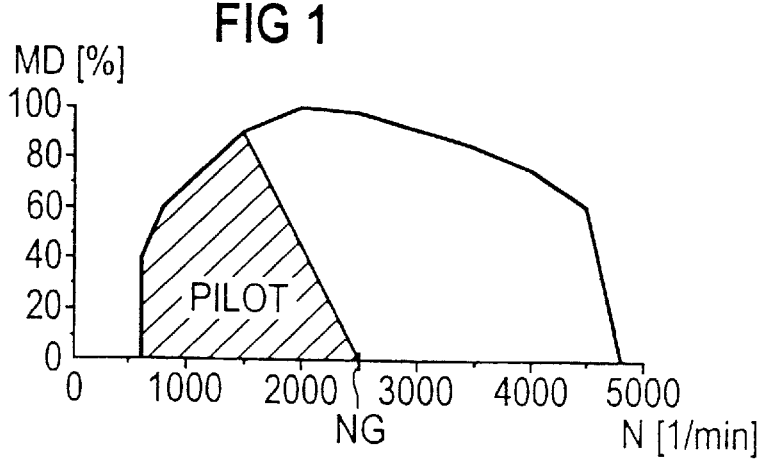
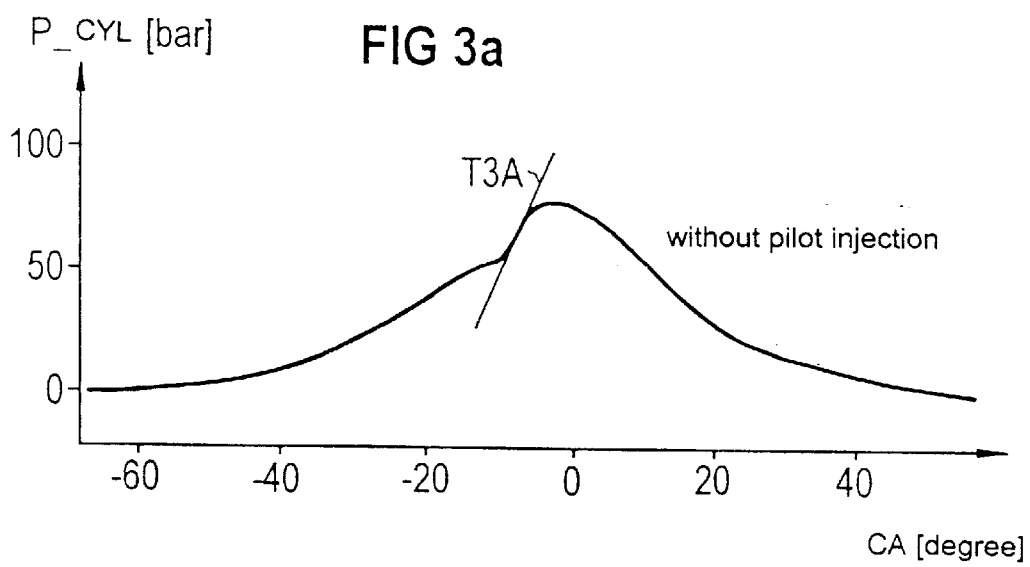
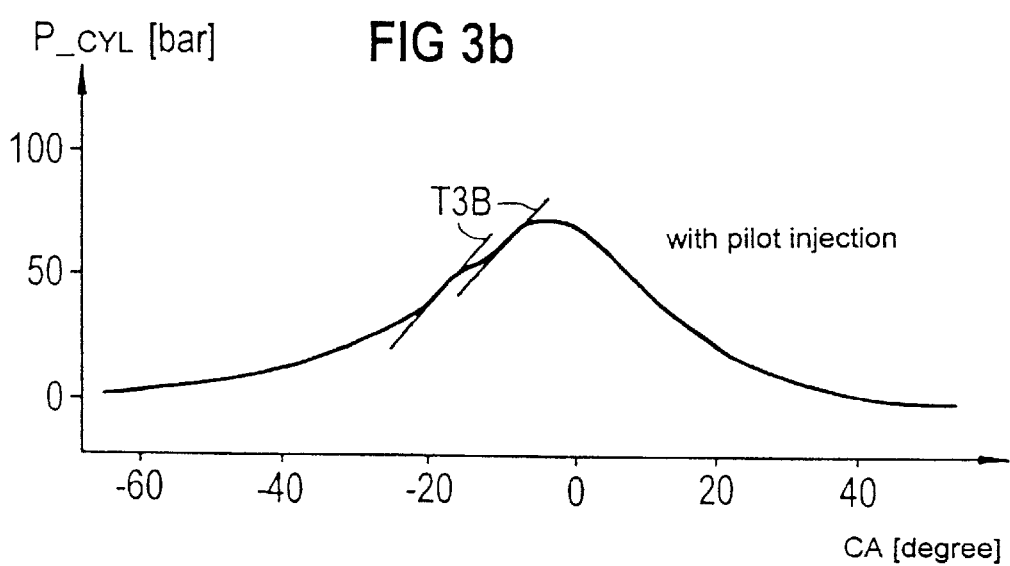

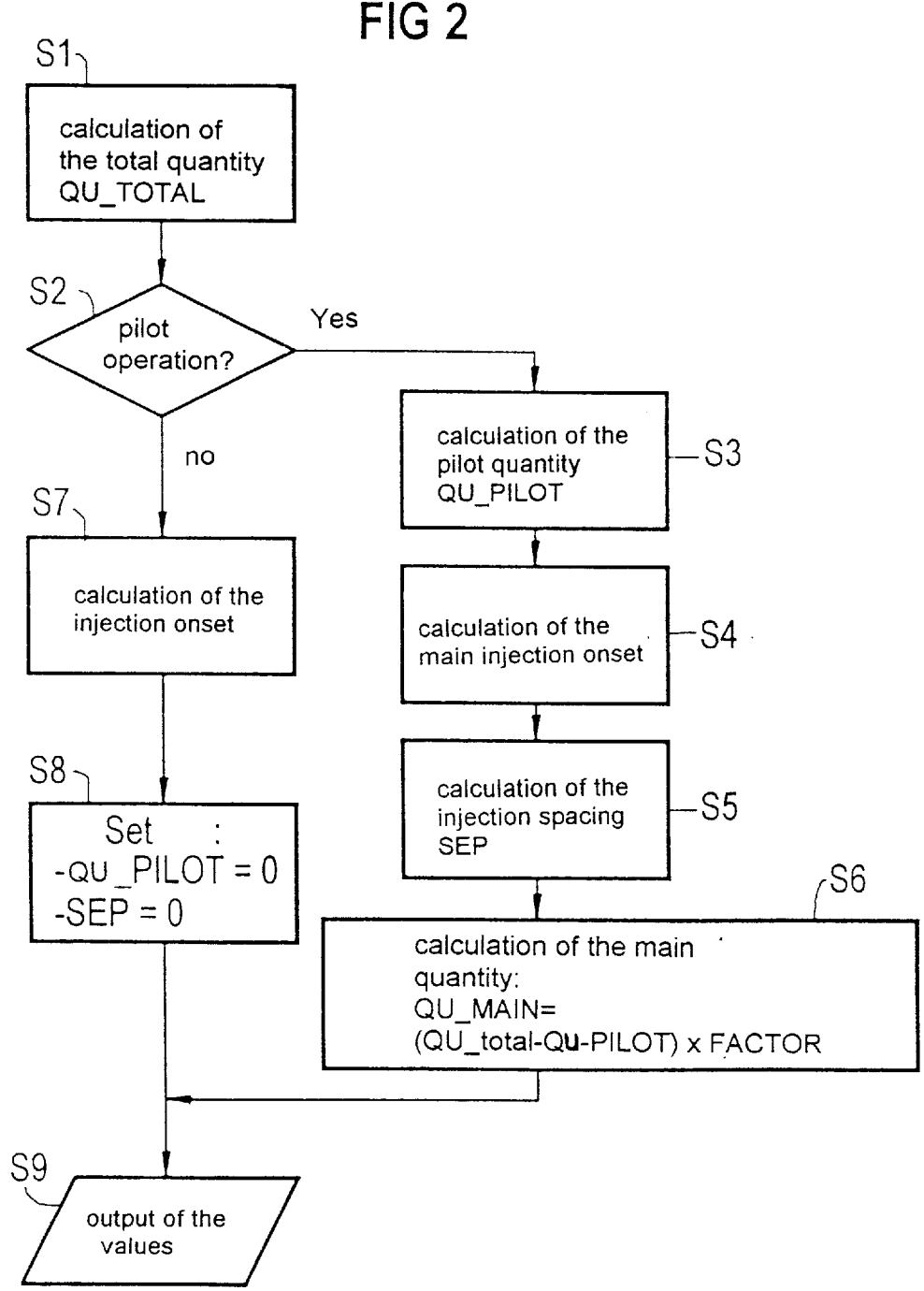

PROCESS FOR SUPPRESSING TORQUE JUMPS DURING OPERATION OF AN INTERNAL COMBUSTION ENGINE

BACKGROUND OF THE INVENTION

1. Field of the Invention

The invention relates to a process for suppressing torque jumps during operation of an internal combustion engine, in which a calculated total injection quantity of fuel to be supplied to a cylinder of the internal combustion engine is metered as a function of an operating point of the internal combustion engine, either during a single injection process or by dividing into two injection processes per cylinder stroke, a pilot injection quantity is metered during a first injection process and a main injection quantity is metered during a second injection process.

In a diesel internal combustion engine, in particular in a direct injection diesel internal combustion engine, combustion noise can be considerably reduced if the fuel quantity is not injected once, but is divided into two injections per cylinder stroke. First, a small, so-called pilot quantity, and then, according to a spacing angle, a main quantity, is injected into the cylinder according to German Published, Non-Prosecuted Patent Application DE 39 35 937 A1. That achieves a reduction of a fuel chamber pressure gradient and consequently a slower buildup of pressure in the combustion chamber.

U.S. Pat. No. 4,782,803 has disclosed a process for controlling the fuel injection for a fuel injection pump, with a high pressure chamber that can be connected to fuel injection nozzles of an internal combustion engine. The fuel is subjected to pressure in the high pressure chamber and the pressurized fuel is fed from there to fuel injection nozzles. The pump furthermore has a low pressure chamber, with a connecting path connected to the high pressure chamber and the low pressure chamber, and has a solenoid valve for selectively closing and opening the connecting path, wherein during the pressurization of fuel in the high pressure chamber, the solenoid valve is selectively closed and opened in such a way that a pilot injection and then a main injection are executed and a start time and end time of the pilot injection are defined as a function of working conditions of the machine.

The noise behavior must be improved, primarily at low or average speeds or rpms and up to average loads, while at high speeds and high loads, there is too little time for a pilot injection. Therefore, the pilot injection must be switched on and off depending upon the operating point.

At a transition from the pilot operation into the non-pilot operation and vice versa, torque jumps can occur that reveal themselves as a jerkiness in the vehicle driven by the internal combustion engine and excite vibrations in the vehicle. Therefore, a torque compensation must be established between the types of operation.

Transition functions, which gradually adapt the pilot quantity or the spacing of the injections, cannot be carried out for the following reasons:

The effective pilot quantities are very small and range along the lower limit of the minimally meterable injection quantities. A gradual increase from zero to the desired pilot quantity or a slow return is therefore not possible.

A minimum spacing must exist between the pilot and the main injection time since otherwise the two combustions coincide and the combustion chamber pressure increases considerably.

SUMMARY OF THE INVENTION

It is accordingly an object of the invention to provide a process for suppressing torque jumps during operation of an internal combustion engine, which overcomes the hereinafore-mentioned disadvantages of the heretofore-known methods of this general type and which changes over between pilot and non-pilot types of operation at every possible operating point of the engine without the occurrence of torque jumps.

With the foregoing and other objects in view there is provided, in accordance with the invention, a process for suppressing torque jumps during operation of an internal combustion engine, which comprises metering a calculated total injection quantity of fuel to be supplied to a cylinder of an internal combustion engine as a function of an operating point of the internal combustion engine, either during a single injection process or by dividing into two injection processes per cylinder stroke and metering a pilot injection quantity during a first injection process and a main injection quantity during a second injection process; forming a difference between the total injection quantity and the pilot injection quantity and acting upon the difference with a correction factor producing a balancing of the torque as a function of the operating point of the engine to obtain a value; and representing the main injection quantity with the obtained value for setting the same torque during operation with two injection processes as during operation with only one injection process with the total injection quantity.

In accordance with another mode of the invention, there is provided a process which comprises storing the correction factor in a characteristic diagram.

In accordance with a further mode of the invention, there is provided a process which comprises obtaining the correction factor as a result of a comparison of two torque models for the internal combustion engine.

In accordance with a concomitant mode of the invention, there is provided a process which comprises forming a quantity difference and evaluating the quantity difference using the correction factor, based on a smallest minimally meterable pilot injection quantity, the total injection quantity and a smallest spacing between the two injection processes.

The operating point of the internal combustion engine is characterized by speed and total injection quantity supplied. As a result, a particular torque is set. The goal is to use the predetermined total quantity to produce the same torque in the pilot operation as in the non-pilot operation. To that end, the difference is produced from the predetermined total quantity and the pilot quantity and then the difference is evaluated with a correction factor. The correction factor produces the torque balancing between the types of operation. The correction factor can be determined in widely varying ways, for example as a function of the operating point of the internal combustion engine (applicatively or mathematically) or as the result of a comparison of two moment models.

The principle of the process can be used wherever torque differences occur between several possible types of operation, for example at idling control transition or at active/inactive cylinder balancing, etc.

Other features which are considered as characteristic for the invention are set forth in the appended claims.

Although the invention is illustrated and described herein as embodied in a process for suppressing torque jumps during operation of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a speed-torque diagram of a diesel internal combustion engine with a shaded region inside which a pilot operation is possible;

FIG. 2 is a timing diagram for the process according to the invention; and

FIGS. 3a and 3b are diagrams showing measured courses of combustion chamber pressure of an internal combustion engine, with and without pilot operation.

DESCRIPTION OF THE PREFERRED EMBODIMENTS

Referring now to the figures of the drawings in detail and first, particularly, to FIG. 1 thereof, there is seen a typical course of a torque-speed characteristic curve of a diesel internal combustion engine, wherein reference symbol MD indicates the torque or number of revolutions and reference symbol N indicates the speed or rpm. An area defined by these two parameters is divided into two regions by a straight line, which is not shown in detail. A region in which a pilot operation is possible is depicted with shading. Above a particular torque limit value NG for a selected internal combustion engine, which is NG=2500 1/min in this exemplary embodiment, independent of the torque, no further pilot injection is carried out. A pilot injection is carried out for all operating points of the internal combustion engine that lie to the left of the straight line, i.e. in the shaded region.

Since the operating point of the internal combustion engine is characterized by the speed and the total injection quantity supplied, and since at the transition from pilot to non-pilot operation no torque jump should occur with the predetermined total quantity, a balancing of the torque is carried out between the two types of operation, as is explained in more detail in conjunction with the flow chart according to FIG. 2.

In a process step S1, a total injection quantity of fuel QU_TOTAL is computed according to known calculation methods, depending on the desire of the driver, the currently prevailing operation parameters, and additional functions, such as cylinder balancing or the anti-jerking function.

Then in a process step S2, an inquiry is made as to whether or not a pilot operation is possible. To this end, the operating point is checked to see whether or not it lies inside the shaded speed/torque region of FIG. 1. If this is the case, then in a process step S3 a pilot quantity QU_PILOT is calculated, and then an injection onset for a main injection is calculated in a process step S4. After calculation of an injection spacing SEP between the main injection onset and the pilot injection onset in a process step S5, a main quantity QU_MAIN is calculated from the calculated total quantity QU_TOTAL and the pilot quantity QU_PILOT in a process step S6, according to the following relation:

QU_MAIN=(QU_TOTAL−QU-PILOT)*FACTOR

For example, the correction factor FACTOR can be read from a characteristic mapping or diagram of a memory belonging to an electronic control device of the internal combustion engine as a function of the operating point of the internal combustion engine or it can be obtained as a comparison result of two torque models that are known in and of themselves.

The values which are thus computed for the injection quantities, the injection onset, and the injection spacing are output in a process step S9, and the corresponding actuators are triggered.

If the result of the inquiry in the process step S2 is that no pilot operation is possible, then the injection onset is calculated in the usual manner in a process step S7 and then both the value for the pilot quantity QU_PILOT and the value for the injection spacing SEP are set to zero in a process step S8. Then the values calculated for the non-pilot operation are output so that the calculated fuel quantity is injected during a single injection process.

In the case of a predetermined internal combustion engine, at a speed of N=1000 1/min and a torque of MD=35N, a course of a cylinder pressure P_CYL is represented as a function of a crankshaft angle CA, once during operation without pilot injection in FIG. 3a and once during operation with pilot injection in FIG. 3b, in accordance with the process according to the invention. It is evident from a comparison of pressure changes that occur in the injection processes, clarified by respective tangents T3A and T3B, that upon operation with pilot injection, the pressure increase is significantly slower, through the use of which a torque jump can be prevented and combustion noise can be considerably reduced.

We claim:

1. A process for suppressing torque jumps during operation of an internal combustion engine, which comprises:

metering a calculated total injection quantity of fuel to be supplied to a cylinder of an internal combustion engine as a function of an operating point of the internal combustion engine, during a single injection process or during two injection processes per cylinder stroke and metering a pilot injection quantity during a first injection process and a main injection quantity during a second injection process;

forming a difference between the total injection quantity and the pilot injection quantity and acting upon the difference with a correction factor producing a balancing of the torque as a function of the operating point of the engine to obtain a value; and representing the main injection quantity with the obtained value for setting the same torque during operation with two injection processes as during operation with only one injection process with the total injection quantity.

2. The process according to claim 1, which comprises storing the correction factor in a characteristic diagram.

3. The process according to claim 1, which comprises obtaining the correction factor as a result of a comparison of two torque models for the internal combustion engine.

4. The process according to claim 1, which comprises forming a quantity difference and evaluating the quantity difference using the correction factor, based on a smallest minimally meterable pilot injection quantity, the total injection quantity and a smallest spacing between the two injection processes.

* * * * *